April 13, 1937. G. E. SWARTZ 2,076,828

LOCK FOR CLAMPS AND THE LIKE

Filed March 4, 1932

INVENTOR
Guy E. Swartz
By C. F. Heinkel
ATTORNEY

Patented Apr. 13, 1937

2,076,828

UNITED STATES PATENT OFFICE 2,076,828

LOCK FOR CLAMPS AND THE LIKE

Guy E. Swartz, Detroit, Mich.

Application March 4, 1932, Serial No. 596,888

14 Claims. (Cl. 192—8)

My invention relates to locking means for clamps, jigs, and the like.

In clamps or jigs or any device wherein work is to be held it is quite convenient, and in many cases, quite necessary that a locking means be provided to hold the clamp in work holding position and to temporarily hold the clamp in other positions and to prevent the same from self unclamping or self movement so that work may not be loosened or the clamp does not move at an improper time but still have a means of releasing the lock independently or individually or volitionally to release work and the clamp from any position thereof.

An object of my invention is to provide a simple, inexpensive, and efficient means to lock clamps for holding work until volitionally released and to release clamps from work when it is desired to release the work and to releasably hold clamps in any other position.

I attain my object by the mechanism illustratively shown in the accompanying drawing, forming part of this specification, in which drawing.

Similar reference characters refer to similar parts throughout all of the views.

The operating shaft A is intended to be rotated for operation of a clamp or other apparatus which requires locking against self rotation in stages of its revolutions.

The driven member B is shown as a part of the shaft A in the form of a disk keyed onto the shaft A by means of the key 10 and has the flat faces 11 and 12 and the recess 13 between these flat faces.

Figure 1:
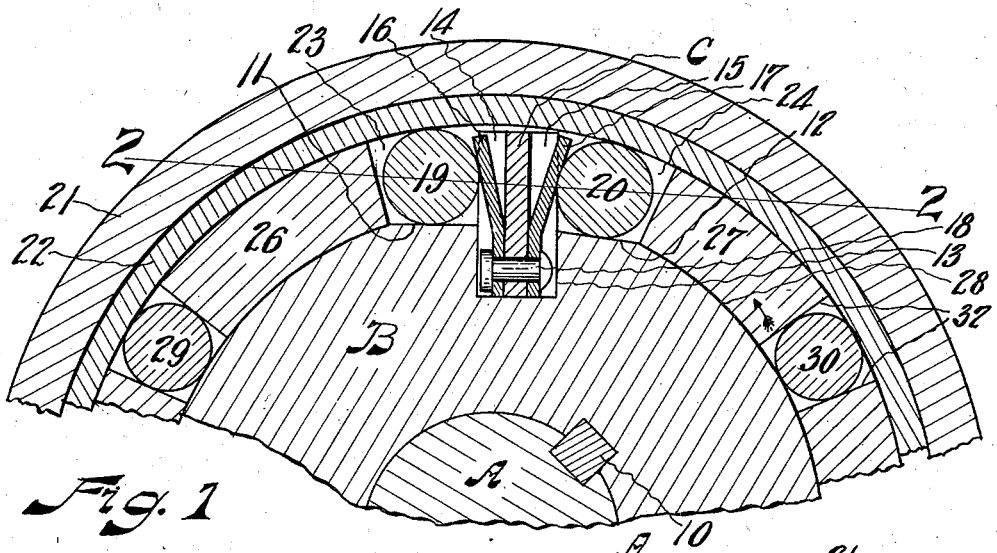
Fig. 1 is a fragmental sectional view of a locking means embodying my invention and shows one locking mechanism although it is obvious that the same mechanism can be repeatedly applied in the same locking means.
Figure 3:
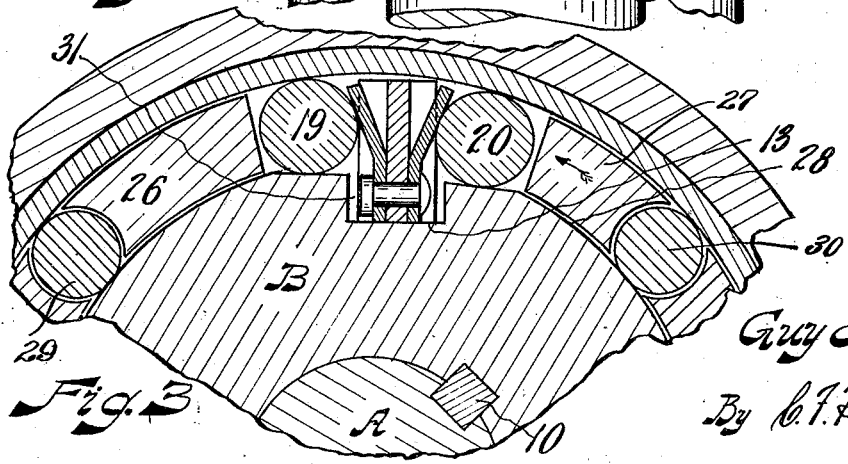
Fig. 3 is a fragmental sectional view similar to Fig. 1 showing a modification of the device of Fig. 1.

One end of the block C fits into the recess in Fig. 1 but is loose therein in Fig. 3 for purposes appearing presently.

Two opposite grooves 14 and 15 are provided in the block C and are disposed longitudinally thereof and the lower ends of the springs 16 and 17 each rests against the bottom of the corresponding groove and both springs are securely held against the respective bottoms by means of the rivets 18. The upper part of the springs are bent oppositely outwardly with respect to the block.

The locking members 19 and 20 are shown as plain cylindrical rollers riding on the faces 11 and 12, respectively, and on the bore of the stationary casing 21 which may be a separate casing or a part of a structure and may have the hardened race 22 pressed thereinto.

The faces 11 and 12 are so arranged in relation to the race 22 that they form, with the bore in the casing, inclined planes or spaces continually diminishing in width, radially of the device, so that the spaces 23 and 24 become narrower in opposite directions as they recede from the block C.

The springs 16 and 17 abut the respective locking rollers as shown and the locking rollers normally also contact the block C on opposite sides thereof as close as possible in line with the contact of the springs on the locking rollers.

The driving member D is shown as journaled on the shaft A and also in the casing 21 and has the hub 25 adapted to receive a suitable driving means or such a means may be provided on or to any part of the driving member D and also has the prongs 26 and 27 extending into the casing and between the bore therein and the concentric faces 28 on the driven member B. In some instances it may be advisable to have a close fitting journal of the prongs 26 and 27 on the bore of the casing and on the driven member B as shown in Fig. 1. In other cases, it may be desirable to have the prongs fit loosely to relieve friction as shown in Fig. 3 but, in such cases, I prefer to use the centralizing rollers 29 and 30 rolling on the bore of the casing and on the faces 28. There should not be a loose or sloppy fit between the driving member D and the bore in the casing.

For this latter purpose I prefer that the prongs 26 and 27 are not in contact on the members B and 22 as seen in Fig. 3 and that the prongs 26 and 27 have recesses therein, axially thereof and of such diameter that the same cut through the circular walls of the prongs. The centralizing rollers 29 and 30 are then inserted into these recesses and fit loosely therein and the sides thereof project through the cut through parts of the walls of the recesses and contact the outer circular wall of the member B and the inner circular wall of the member 21. The centralizing rollers so mounted in the recesses can not move therein sufficiently far to be wedged or to wedge themselves.

In operation, with the elements as shown in Figs. 1 and 3, each locking roller is pressed into the narrower part of the corresponding space by the springs 16 and 17 and the member B and the shaft A and the mechanism thereon can not move in either direction when a load is applied thereon from a source other than the driving means.

In jigs having work holding clamps for instance, for which the invention is well adapted, this locking prevents self movement of the clamp from any position thereof and can be moved only through the driving means.

When the member D with the prongs thereon is rotatively moved in the direction of the arrow in Figs. 1 and 3, the prong 27 first contacts the locking roller 20 and moves the same out of its locking position and against the spring 17 and thereby moves the block C resiliently in the same direction and, due to the lower part of the block being in the recess 13, rotates the driven member B and the shaft and clamping mechanism thereon for a movement of the clamp.

During this movement, the locking roller 19 is released from its locking position by the driven member then rotating in the direction of the arrow and leaving the roller 19 in the wider part of the space 23 and thereby releases the locking thereof.

When this movement stops without any outside pressure being brought upon the clamp, the springs will drive the locking rollers back into original locking position and lock the clamp against self movement in either direction.

When the clamp encounters a resistance, as when it contacts work, the clamp practically stops moving. The driven member tends to stop movement with the clamp. A further movement of the driving member then compresses the springs 16 and 17 more tightly and thereby moves the roller 19 into a more shallow part of the space 23 and wedges it there and thereby locks the driven member B and the shaft A and the clamp moving mechanism thereon against reverse rotation in the casing.

Upon a movement of the driving member in a direction opposite the arrow, the prong 26 first contacts the locking roller 19 and moves it out of its locking position and the entire movement set forth above is reversed so that the lock as shown can be used to operate both ways.

The recess in Fig. 3 is wider than the block to provide the space 31 and some play between the block and the sides of the recess and also to allow the locking rollers more freedom to adjust themselves. In the position shown in Fig. 3 for instance, the block can tilt in the recess so that the springs can equalize and the rollers can adjust and wedge themselves into equally locking positions.

Figure 2:
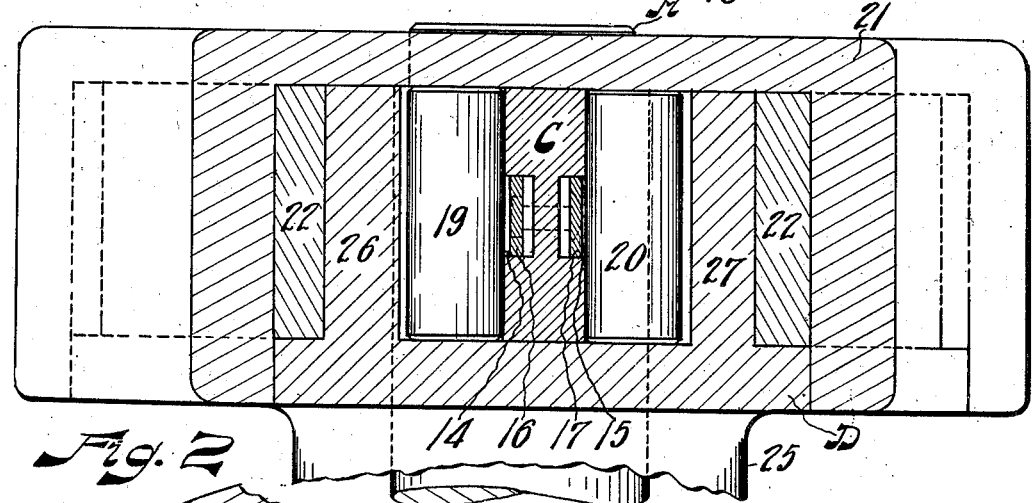
Fig. 2 is a section on line 2—2 of Fig. 1 showing the elements more clearly in a plane at right angles to Fig. 1.

The rollers 29 and 30 may abut the radially flat faces 32 on the prongs 26 and 27 as seen in Figs. 1 and 2 or, as modified in Fig. 3, may abut only the circular faces of the members 22 and B and of the recesses in the prongs.

I am aware that locks have been made with wedging members, I, therefore, do not claim that feature broadly; but,

I claim:

1. In a locking device for rotatable elements, a casing, a driven member in and rotatable relative to said casing, an individual block partly inserted into said driven member and laterally movable therein and having a part thereof extending radially beyond the periphery of said driven member, a flat spring secured to each side of said block, a locking roller adjacent to each of said springs and each normally wedged oppositely between said driven member and the bore of said casing by said springs, movable driving prongs each adapted, upon movement thereof, to engage one of said rollers to move the same out of its wedging position and into contact on one of said springs to move said block and rotate said driven member and to wedge the other one of said rollers more tightly when said driven member encounters a resistance to rotation thereof above the normal resistance of the device to lock said driven member against self reversing, and said springs wedging both of said rollers upon stoppage of movement of said prongs.

2. In a locking means, a casing, a driven member rotatable therein, a block loosely carried by said driven member, a spring on each side of said block, a locking member against each of said springs and between the corresponding side of said block and said driven member and said casing, both of said locking members normally wedged oppositely against said driven member and said casing, and prongs each adapted upon operation thereof to wedge said locking members more tightly into locking contact on said driven member and said casing when said driven member encounters a resistance to rotation thereof to lock the same against self reversing and to release the opposite one of said locking members from locking.

3. In a locking means, a casing, a driven member rotatable therein, a tiltable block inserted into said driven member, a locking member at each side of said block and each adapted to be wedged between said casing and said driven member, and a movable prong, upon movement thereof, engaging one of said locking members to tilt and contact the same onto said block and said block onto said driven member to rotate said driven member and, upon stopping rotation thereof, move said block into contact on the other one of said locking members and move the same into a releasable wedgingly locking relation between said casing and said driven member.

4. In a locking means for rotatable elements, a casing, a driven member therein and rotatable relative thereto, a block inserted into said driven member and laterally movable relative thereto, a locking member at each side of said block and each adapted to be wedged between said casing and said driven member, a pair of movable prongs, one, upon movement thereof, contacting and moving one of said locking members and thereby moving the same out of its wedging positions and moving said block and rotating said driven member in one direction and said block moving the other one of said locking members into more tight wedging relation with said casing and said driven member for locking of said driven member against self reversing in one direction when the same meets with resistance to rotation thereof greater than the power of either one of said springs and, upon movement of said prongs in an opposite direction, moves the wedged locking member out of its wedging position, rotates said driven member as set forth but in an opposite direction and releasably wedges the other locking member for locking of said driven member against self reversing in the opposite direction when the same meets with resistance to rotation thereof greater than the power of either one of said springs.

5. In a locking means, the combination of a casing, a driven member rotatable therein, a block carried by and movable sidewise relative to said driven member, a spring on each side of said block, a locking roller adjacent to each of said springs, and a pair of movable prongs adapted to engage, upon respective directional movements thereof, the respective one of said rollers to rotate said driven member until the same encounters a resistance greater than the power in said springs and to wedge the other one of said rollers to lock the mechanism in said casing against reversing.

6. In a locking device for rotatable elements, a casing, a member rotatable in said casing, a block tiltably carried by said rotatable member, a spring secured to each side of said block, a rotatable locking member adjacent each of said springs, both of said locking members normally in opposite wedging contact on said rotatable member and on said casing, a movable prong adapted to engage, upon rotative movement thereof, one of said locking members to move the same out of its wedging contact and into contact on said block to rotate said rotatable member and to wedge the other one of said locking members at the end of said rotative movement to lock said rotatable member against self reversing, in said casing.

7. In a locking device for rotatable elements, a casing, a driven member in and rotatable relative to said casing, an individual tiltable block partly inserted into said driven member and having a part extending radially therefrom, a flat spring secured to each side of said block, a locking roller adjacent to each of said springs and to said driven member and to the bore of said casing, movable driving prongs each adapted, upon movement thereof, to move one of said rollers and thereby rotate said driven member and also wedge the other one of said rollers between said driven member and said bore at the end of a rotative movement of said driven member to lock said driven member against self reversing, in said casing.

8. In a locking device for rotatable elements, a casing, a driven member in and rotatable relative to said casing and having faces oppositely inclined to the bore of said casing, an individual block sidewise movably inserted into said driven member between said faces, a spring on each side of said block, a locking roller on each of said faces, adjacent to the corresponding one of said springs and the bore of said casing and both rollers normally wedged oppositely between the corresponding one of said faces and the bore of said casing by said springs, movable driving prongs each adapted, upon movement thereof, to engage one of said rollers to release the locking thereof and to contact the corresponding roller on the corresponding spring to rotate said driven member and to wedge the other one of said rollers more tightly when said driven member encounters a resistance to rotation thereof greater than the normal resistance of the device to lock said driven member against self reversing, and said springs wedging both of said rollers upon stoppage of movement of said prongs.

9. In a locking device for rotatable elements, a casing, a rotatable shaft extending into said casing, a driven member on said shaft in said casing and having faces oppositely inclined to the bore of said casing, an individual tiltable block inserted into said driven member between said inclined faces thereon, a spring on each side of said block, a locking roller against each of said springs and a side of said block and normally wedged oppositely between the corresponding one of said faces and the bore of said casing by said springs, a driving member journaled on said shaft and having prongs each adapted to engage, upon operation thereof, one of said rollers and move the same to release the wedging thereof and thereby move said block to rotate said shaft and to more tightly wedge the other one of said rollers at the end of a rotative movement of said prongs to lock said shaft against self reversing, relative to said casing.

10. In a locking device for rotatable elements, a casing, a driven member in and rotatable relative to said casing, centralizing rollers between said casing and said driven member, an individual block tiltably in said driven member intermediate of said centralizing rollers, a spring on each side of said block, a locking roller against each of said springs and both normally wedged oppositely between said driven member and the bore of said casing by said springs, and driving prongs each adapted upon movement thereof to engage one of said rollers to move the same and said block to rotate said driven member and to more tightly wedge the other one of said rollers at the end of a movement of said prongs to lock said driven member against self reversing, relative to said casing.

11. In a locking device for rotatable elements, a casing, a driven member in and rotatable relative to said casing, a tiltable block carried by said driven member, a spring on each side of said block, a locking member adjacent each of said springs and the corresponding side of said block, both of said locking members normally wedged oppositely between said casing and said driven member, by said springs, and movable prongs each adapted, upon movement thereof, to move one of said locking members out of its wedging position and into contact on said block to rotate said driven member and to more tightly wedge the other one of said locking members at the end of a movement of said prongs to lock said driven member against self reversing, in said casing.

12. In a locking device for rotatable elements, a casing, a driven member therein and rotatable relative thereto to move an element, a tiltable block inserted into said driven member, a locking member at each side of said block and each adapted for wedging between said casing and said driven member, and a movable prong to, upon movement thereof, move one of said locking members and thereby tilt said block and rotate said driven member for movement of the element and move the other one of said locking members into releasable wedging position between said casing and said driven member for locking the same against self reversing thereof.

13. In a locking device for rotatable elements, a casing, a driven member therein and rotatable relative thereto, to move an element, a pair of locking members between relatively and oppositely inclined surfaces of said casing and said driven member, an individual block between said locking members and tiltably inserted into said driven member, and a movable prong to, upon movement thereof, move said locking members and tilt said block for rotation of said driven member and movement of the element and releasably locking of the latter against self reversing.

14. In a locking means a casing, a driven member therein and rotatable relative thereto to move an element, a pair of locking members between relatively, oppositely inclined surfaces of said casing and of said driven member, a block between said locking members and tiltably inserted into said driven member, a spring on each side of said block and normally tending to respectively separately move said locking members on said inclined surfaces, a movable prong to, upon movement thereof, move said locking members relative to said surfaces and tilt said block and thereby rotate said driven member and move the element, and one of said springs moving one of said locking members for wedging thereof between said inclined surfaces to releasably lock said driven member against self reversing.

GUY E. SWARTZ.